(12) United States Patent
Pfaendner et al.

(10) Patent No.: US 10,214,631 B2
(45) Date of Patent: Feb. 26, 2019

(54) POLYMER COMPOSITION WITH IMPROVED LONG-TERM STABILITY, MOULDED PARTS PRODUCED HEREFROM AND ALSO PURPOSES OF USE

(71) Applicant: FRAUNHOFER-GESELLSCHAFT ZUR FÖRDERUNG DER ANGEWANDTEN FORSCHUNG E.V., München (DE)

(72) Inventors: Rudolf Pfaendner, Rimbach (DE); Elke Metzsch-Zillingen, Steffeln (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 0 days.

(21) Appl. No.: 14/442,606

(22) PCT Filed: Nov. 18, 2013

(86) PCT No.: PCT/EP2013/074058
§ 371 (c)(1),
(2) Date: May 13, 2015

(87) PCT Pub. No.: WO2014/076273
PCT Pub. Date: May 22, 2014

(65) Prior Publication Data
US 2016/0272789 A1    Sep. 22, 2016

(30) Foreign Application Priority Data
Nov. 19, 2012 (DE) .................. 10 2012 022 482

(51) Int. Cl.
| | |
|---|---|
| *C08K 5/00* | (2006.01) |
| *C08K 7/24* | (2006.01) |
| *C08K 5/134* | (2006.01) |
| *C08K 5/20* | (2006.01) |
| *C08K 5/526* | (2006.01) |
| *C08L 23/12* | (2006.01) |
| *C08K 3/04* | (2006.01) |
| *B29C 47/00* | (2006.01) |
| *B29K 23/00* | (2006.01) |
| *B29K 105/16* | (2006.01) |
| *B29K 507/04* | (2006.01) |

(52) U.S. Cl.
CPC .............. *C08K 7/24* (2013.01); *C08K 5/005* (2013.01); *C08K 5/1345* (2013.01); *C08K 5/20* (2013.01); *C08K 5/526* (2013.01); *C08L 23/12* (2013.01); *B29C 47/0004* (2013.01); *B29K 2023/12* (2013.01); *B29K 2105/162* (2013.01); *B29K 2507/04* (2013.01); *C08K 3/04* (2013.01); *C08K 2201/011* (2013.01); *C08L 2201/08* (2013.01)

(58) Field of Classification Search
CPC ................................................. C08K 5/005
See application file for complete search history.

(56) References Cited

U.S. PATENT DOCUMENTS

| | | |
|---|---|---|
| 2,682,522 A | 6/1954 | Coover et al. |
| 2,716,101 A | 8/1955 | Coover et al. |
| 2,891,915 A | 6/1959 | McCormack et al. |
| 3,326,852 A | 6/1967 | Thomas |
| 3,442,854 A | 5/1969 | Curtius et al. |
| 3,488,329 A | 1/1970 | Johnson |
| 3,578,641 A | 5/1971 | Johnson |
| 3,915,930 A | 10/1975 | Dotson, Jr. et al. |
| 3,919,363 A | 11/1975 | Ura et al. |
| 3,946,093 A | 3/1976 | Koto et al. |
| 4,218,332 A | 8/1980 | Schwab et al. |
| 4,328,174 A | 5/1982 | Schmidt et al. |
| 4,331,614 A | 5/1982 | Schmidt et al. |
| 4,374,971 A | 2/1983 | Schmidt et al. |
| 4,415,719 A | 11/1983 | Schmidt et al. |
| 5,216,113 A | 6/1993 | Schulz-Schlitte et al. |
| 5,334,692 A | 8/1994 | Hess et al. |
| 6,288,210 B1 | 9/2001 | Shobha et al. |
| 6,291,630 B1 | 9/2001 | König et al. |
| 6,861,499 B2 | 3/2005 | Vinciguerra et al. |
| 7,115,765 B2 | 10/2006 | Sprenger et al. |
| 7,390,970 B2 | 6/2008 | Lee et al. |

(Continued)

FOREIGN PATENT DOCUMENTS

| | | |
|---|---|---|
| CA | 819181 A | 7/1969 |
| CN | 102031101 A | 4/2011 |

(Continued)

OTHER PUBLICATIONS

Shi et al., "Influence of wall number and surface functionalization of carbon nanotubes on their antioxidant behavior in high density polyethylene," *Carbon*, 50(3):1005-1013 (2012).
Watts et al., "Carbon nanotubes as polymer antioxidants," *J. Mater. Chem.*, 3(13): 491-495 (2003).
*Plastics Additives Handbook*, 5th edition, Chapter I—"Antioxidants," H. Zweifel, editor, Munich, pp. 1-139 (2001).

(Continued)

*Primary Examiner* — Megan McCulley
(74) *Attorney, Agent, or Firm* — Leydig, Voit & Mayer, Ltd.

(57) ABSTRACT

The present invention relates to a polymer composition with improved long-term stability which comprises at least one thermoplastic polymer, carbon nanotubes, at least one antioxidant and also at least one additive or consists hereof. In addition, the present invention relates to molded parts which can be produced from the polymer compositions according to the invention. The invention likewise indicates possibilities for use of the polymer composition or of the molded parts.

18 Claims, No Drawings

(56) References Cited

U.S. PATENT DOCUMENTS

| | | | |
|---|---|---|---|
| 7,745,519 B2 | 6/2010 | Ihara et al. | |
| 7,816,486 B2 | 10/2010 | Freitag et al. | |
| 7,872,198 B2 | 1/2011 | Lee et al. | |
| 8,058,329 B2 | 11/2011 | Just et al. | |
| 8,288,456 B2 | 10/2012 | Feldermann et al. | |
| 8,349,925 B2 | 1/2013 | Butz | |
| 8,853,307 B2 | 10/2014 | Butz | |
| 2002/0004556 A1* | 1/2002 | Foulger | C08L 23/06 525/70 |
| 2003/0100683 A1* | 5/2003 | Toyoizumi | C08C 19/02 525/331.9 |
| 2004/0077771 A1* | 4/2004 | Wadahara | B82Y 30/00 524/495 |
| 2005/0020800 A1 | 1/2005 | Levchik et al. | |
| 2005/0064177 A1 | 3/2005 | Lee et al. | |
| 2005/0176983 A1 | 8/2005 | Sprenger et al. | |
| 2006/0089434 A1* | 4/2006 | Nodera | B82Y 30/00 524/115 |
| 2006/0142458 A1* | 6/2006 | Pang | B82Y 30/00 524/444 |
| 2007/0135538 A1 | 6/2007 | Ihara et al. | |
| 2007/0219295 A1 | 9/2007 | Levchik et al. | |
| 2008/0045673 A1 | 2/2008 | Piotrowski et al. | |
| 2008/0167405 A1 | 7/2008 | Just et al. | |
| 2008/0226918 A1 | 9/2008 | Lee et al. | |
| 2009/0118394 A1 | 5/2009 | Feldermann et al. | |
| 2009/0286060 A1* | 11/2009 | Sala | C07D 209/48 428/220 |
| 2010/0210745 A1* | 8/2010 | McDaniel | C09D 5/008 521/55 |
| 2010/0230158 A1 | 9/2010 | Hase et al. | |
| 2010/0280215 A1 | 11/2010 | Just et al. | |
| 2011/0027512 A1 | 2/2011 | Lee et al. | |
| 2011/0256457 A1 | 10/2011 | Utsumi | |
| 2011/0257310 A1* | 10/2011 | Butz | C08K 5/5317 524/101 |
| 2013/0203928 A1 | 8/2013 | Hocke et al. | |
| 2014/0005289 A1 | 1/2014 | Butz | |
| 2016/0052927 A1 | 2/2016 | Pfaendner et al. | |

FOREIGN PATENT DOCUMENTS

| | | |
|---|---|---|
| CN | 102115530 A | 7/2011 |
| CN | 102115558 A | 7/2011 |
| CN | 102250400 A | 11/2011 |
| CN | 102342869 A | 2/2012 |
| CN | 102344598 A | 2/2012 |
| CN | 102382453 A | 3/2012 |
| CN | 102585429 A | 7/2012 |
| DE | 268 249 A1 | 5/1989 |
| DE | 100 22 946 A1 | 11/2001 |
| DE | 600 07 914 T2 | 12/2004 |
| DE | 10 2004 010 455 A1 | 9/2005 |
| DE | 10 2007 040927 A1 | 3/2009 |
| DE | 11 2008 003 070 T5 | 9/2010 |
| DE | 10 2009 047030 A1 | 2/2011 |
| DE | 10 2013 005 307 A1 | 9/2014 |
| EP | 0 303 988 A2 | 2/1989 |
| EP | 0 767 182 A2 | 4/1997 |
| EP | 0 935 619 B1 | 6/2001 |
| EP | 2 426 163 A1 | 3/2012 |
| EP | 2 450 401 A1 | 5/2012 |
| JP | H10-213912 A | 8/1998 |
| JP | 2007-016162 A | 1/2007 |
| JP | 2007-016163 A | 1/2007 |
| WO | WO 1999/000450 A1 | 1/1999 |
| WO | WO 2002/074847 A1 | 9/2002 |
| WO | WO 2003/016388 A1 | 2/2003 |
| WO | WO 2003/070736 A1 | 8/2003 |
| WO | WO 2006/084488 A1 | 8/2006 |
| WO | WO 2006/084489 A1 | 8/2006 |
| WO | WO 2008/101845 A1 | 8/2008 |
| WO | WO 2009/080554 A1 | 7/2009 |
| WO | WO 2010/026230 A1 | 3/2010 |
| WO | WO 2010/135398 A1 | 11/2010 |
| WO | WO 2011/000019 A1 | 1/2011 |
| WO | WO 2011/003773 A1 | 1/2011 |
| WO | WO 2011/086114 A1 | 7/2011 |
| WO | WO 2011/117266 A1 | 9/2011 |
| WO | WO 2011/156077 A1 | 12/2011 |
| WO | WO 2012/052376 A1 | 4/2012 |
| WO | WO 2012089998 A2 | 7/2012 |
| WO | WO 2013/020696 A2 | 2/2013 |
| WO | WO 2013/068437 A2 | 5/2013 |
| WO | WO 2013/072295 A1 | 5/2013 |
| WO | WO 2014/154636 A1 | 10/2014 |
| WO | WO 2015/180888 A1 | 12/2015 |
| WO | WO 2015/189034 A1 | 12/2015 |

OTHER PUBLICATIONS

Dintcheva et al., "Photo-oxidation behaviour of polyethylene/multi-wall carbon nanotube composite films," *Polymer Degradation and Stability*, vol. 94, No. 2, pp. 162-170 (2008).

Spitalsky et al., "Carbon nanotube-polymer composites: Chemistry, processing, mechanical and electrical properties," *Progr. Pol. Sci.* 35:357-401 (2010).

Zeynalov et al., "Antioxidative Activity of Carbon Nanotube and Nanofiber," *The Open Materials Science Journal*, vol. 2, pp. 28-34 (2008).

German Patent and Trademark Office, Office Action in German Patent Application No. 10 2012 022 482.6 (dated Jul. 29, 2013).

European Patent Office, International Search Report in International Application No. PCT/EP2013/074058 (dated Mar. 18, 2014).

European Patent Office, Written Opinion in International Application No. PCT/EP2013/074058 (dated Mar. 18, 2014).

European Patent Office, International Preliminary Report on Patentability in International Application No. PCT/EP2013/074058 (dated May 19, 2015).

Aubert et al., "Azoalkanes—novel flame retardants and their structure-property relationship," *Polym. Adv. Technol.* 22(11): 1529-1538 (2011).

Carpino et al.. "The uronium/guanidinium peptide coupling reagents: Finally the true uronium salts," *Angewandte Chemie-International Edition* 41: 442-445 (2002).

Imajo et al., "Polyimides derived from bis-N-hydroxyimides. II. Synthesis and properties of polyimide-esters," *Journal of Polymer Science Part A: Polymer Chemistry*, vol. 18(7), pp. 2189-2196 (1980).

Imajo et al., "Polyimides derived from bis-N-hydroxyimides. III. Polymide-carbonates and polymide-urethanes synthesized from bischlorformate of N,N'-dihydroxypyromellitic diimide," *Journal of Polymer Science Part A: Polymer Chemistry*, vol. 19(7), pp. 1855-1861 (1981).

Katsenis et al., "Initial use of 1-hydroxybenzotriazole in the chemistry of group 12 metals: An 1D zinc(II) coordination polymer and a mononuclear cadmium(II) complex containing the deprotonated ligand in a novel monodentate ligation mode," *Inorg. Chem. Comm.* 12(2): 92-96 (2009).

Pawelec et al., "Triazene compounds as a novel and effective class of flame retardants for polypropylene," *Polym. Degrad. Stab.* 87(6): 48-954 (2012).

Pfaendner, "Nitroxyl radicals and nitroxylethers beyond stabilization: radical generators for efficient polymer modification," *Comptes Rendus Chimie* 9(11):1338-1344 (2006).

Spatz et al. "Some N-Substituted Tetrabromophthalimide Fire-Retardant Additives", *Industrial & Engineering Chemistry Product Research and Development*, vol. 8, pp. 397-398 (1969).

Wilén et al., "Improving weathering resistance of flame-retarded polymers," *Journal of Applied Polymer Science* 129(3):925-944 (2013).

(56) References Cited

OTHER PUBLICATIONS

U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.

\* cited by examiner

POLYMER COMPOSITION WITH IMPROVED LONG-TERM STABILITY, MOULDED PARTS PRODUCED HEREFROM AND ALSO PURPOSES OF USE

CROSS-REFERENCE TO RELATED APPLICATIONS

This patent application is the U.S. national phase of International Application No. PCT/EP2013/074058, filed on Nov. 18, 2013, which claims the benefit of German Patent Application No. 10 2012 022 482.6, filed Nov. 19, 2012, the disclosures of which are incorporated herein by reference in their entireties for all purposes.

The present invention relates to a polymer composition with improved long-term stability which comprises at least one thermoplastic polymer, carbon nanotubes, at least one antioxidant and also at least one further additive or consists hereof. In addition, the present invention relates to moulded parts which can be produced from the polymer compositions according to the invention. The invention likewise indicates possibilities for use of the polymer composition or of the moulded parts.

Carbon nanotubes (CNTs) are an additive class which is used in plastic materials (and coatings) to an increasing degree, in order to improve the mechanical and electrical properties. Thus for example with the addition of 1% CNTs, the tensile strength of the plastic material can be increased by 50% and more. Likewise the electrical conductivity of a plastic material increases therewith by several orders of magnitude (see e.g. Z. Spitalsky et al. Progr. Pol. Sci. 2010, 35, 357-401).

Plastic material composites, so-called carbon composites which comprise carbon nanotubes, are used preferably in long-term applications because of the excellent property combinations, but also because of the costs associated therewith. It is therefore necessary that the general properties of these CNT composites are maintained over the application time period. The long-term stability of plastic materials is normally ensured by the addition of stabilisers, such as e.g. antioxidants (see e.g. Plastics Additives Handbook, editor H. Zweifel, $5^{th}$ edition, Munich 2001). If formulations comprise CNTs, it is however ascertained that, by the addition of normal antioxidants, sufficient long-term stability of the CNT composite is not achieved.

Carbon nanotubes have, like other standard carbon compounds such as carbon black, an antioxidant effect in plastic materials (see e.g. P. C. P. Watts et al. J. Mater. Sci. 2003, 13, 491-495, X. Shi et al. Carbon 2012, 50, 1005-1013), the effect of which however, compared with conventional phenolic antioxidants, must be classed as very weak. Furthermore, the (low) effect can still be improved by surface modification. This knowledge was however obtained with highly-pure CNT products which are not used in commercial applications for reasons of costs. In the case of commercial carbon nanotubes, a loss of the antioxidant property is therefore determined (E. B. Zeynalov et al. The open Materials Science J. 2008, 2, 28-34). The use of commercially available antioxidants in plastic material formulations which comprise CNTs is therefore mentioned in patents/patent applications (e.g. CN 102585429, WO 2012089998, CN 102342869, CN 102344598, CN 102250400, CN 102115558, CN 102382453, CN 102115530).

Starting herefrom, it is the object of the present invention to indicate a carbon nanotube-containing polymer composition which, compared with carbon nanotube-containing polymer compositions known from the state of the art, has improved long-term stability. Likewise, it is the object of the present invention to describe moulded parts produced from corresponding polymer compositions or corresponding purposes of use.

The object is achieved with respect to the polymer composition by the features of patent claim 1, with respect to further processing of this composition, by the features of patent claim 11 and also with respect to a moulded part, by the features of patent claim 15. The dependent patent claims thereby represent advantageous developments.

According to the invention, a polymer composition is hence provided, which comprises
  a) at least one thermoplastic polymer or a blend of at least two thermoplastic polymers,
  b) carbon nanotubes,
  c) at least one antioxidant, selected from the group consisting of phenols, phosphites and/or phosphonites, amines or mixtures or combinations hereof, and also
  d) at least one metal deactivator and/or at least one mono- or polyfunctional epoxide compound
or consists hereof.

Surprisingly, it was established that corresponding polymer compositions have increased ageing resistance, which makes possible new application possibilities and fields of use. The polymer compositions according to the invention are of importance in particular for long-term applications because of their high ageing resistance.

Suitable thermoplastic polymers are:
  a) polymers from olefins or diolefins, such as e.g. polyethylene (LDPE, LLDPE, VLDPE, MDPE, HDPE, mPE), polypropylene, polyisobutylene, poly-4-methylpentene-1, polybutadiene, polyisoprene, polycyclooctene, and also polyolefin-based copolymers in the form of statistical or block structures, such as e.g. polypropylene-polyethylene (EP), EPM or EPDM, ethylene vinyl acetate (EVA), ethylene acrylic ester
  b) polystyrene, polymethylstyrene, styrene-butadiene, poly(styrene-butadiene-styrene) (SBS), poly(styrene-isoprene), poly(styrene-isoprene-styrene) (SIS), polystyrene-butadiene-acrylonitrile) (ABS), poly(styrene-acrylonitrile-acrylate) (ASA), poly(methylacrylate-butadiene-styrene) (MBS), styrene-maleic anhydride polymers including corresponding graft copolymers, such as e.g. styrene on polybutadiene or maleic anhydride on SBS, and also the hydrated polymers obtainable therefrom, such as e.g. poly(styrene-ethylene-butylene-styrene)
  c) halogen-containing polymers, such as e.g. polyvinyl chloride, polyvinylidene chloride and/or chlorinated polyethylene
  d) polymers of unsaturated esters, such as e.g. polyacrylates and polymethacrylates, such as PMMA, polyacrylonitrile and/or polyacrylamide
  e) polymers of unsaturated alcohols and derivatives, such as e.g. polyvinyl alcohol, polyvinyl acetate, polyvinyl butyral
  f) polyacetals, such as e.g. polyoxymethylene
  g) polyphenylene oxides and blends with polystyrene and/or polyamides
  h) polyurethanes, in particular linear polyurethanes
  i) polyamides, such as e.g. polyamide 6, 6.6, 6.10, 4.6, 6.12, 12.12, polyamide 11, polyamide 12 and also (partially) aromatic polyamides, such as e.g. polyphthalamides
  j) polyimides, polyamide imides, polyether imides, polyketones, polysulphones, polyether sulphones, polyphenylene sulphide, polybenzimidazoles k) polyesters, such as e.g. polyethylene terephthalate (PET), polypropylene terephthalate, polybutylene terephthalate (PBT) and polylactic acid (PLA)

l) polycarbonate m) cellulose derivatives, such as e.g. cellulose nitrate, cellulose acetate, cellulose propionate n) and also mixtures, combinations or blends of two or more of the previously mentioned polymers.

Particularly preferred thermoplastic polymers are thereby polypropylene, polyethylene and also the copolymers thereof, polystyrenes and also copolymers hereof, e.g. poly(acrylonitrile-butadiene-styrene) (ABS), poly(styrene-butadiene) (SB) and poly(styrene-butadiene-styrene) (SBS), polyamides, polyesters, polycarbonates and also mixtures or blends hereof.

The carbon nanotubes are preferably selected from the group consisting of multiwall carbon nanotubes.

The phenols contained in the polymer composition according to the invention are preferably selected from the group consisting of compounds of the subsequently illustrated formula

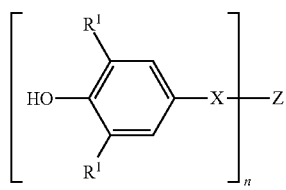

$R^1$ being the same or different with each occurrence and being selected from the group consisting of hydrogen, linear or branched alkyl radicals with 1 to 8 carbon atoms, in particular tert-butyl or methyl, X being selected from the group consisting of alkylene radicals, alkylene-carbonyl radicals, alkylene-amide radicals, n being 1 to 4, and Z in the case where n=1 being hydrogen, in the case where n=2 being a chemical bond or an alkylene, in the case where n=3 being an alkinyl or in the case where n=4 being a carbon atom.

Particularly suitable compounds which can be used as phenolic antioxidant are thereby the following:

Ia
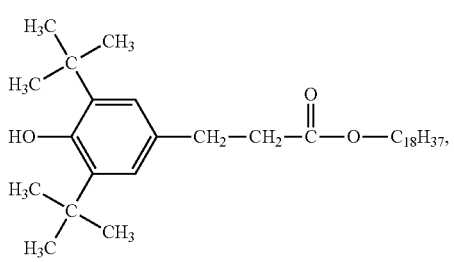

-continued

Ib
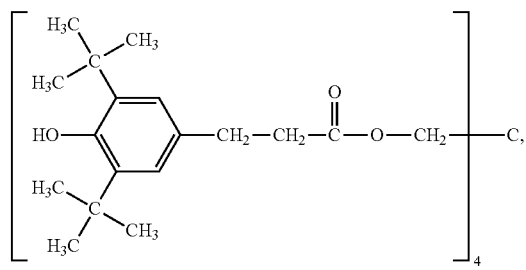

Ic
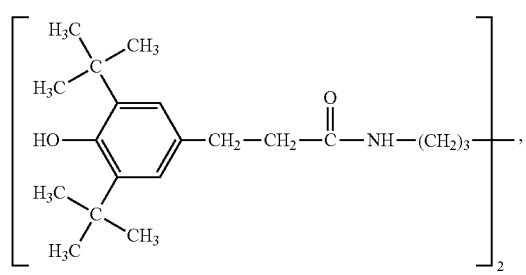

Id
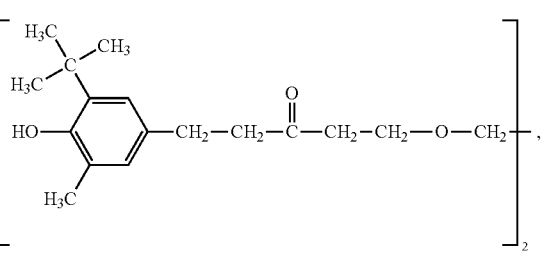

Ie
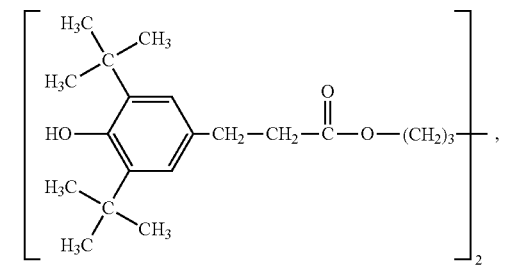

If
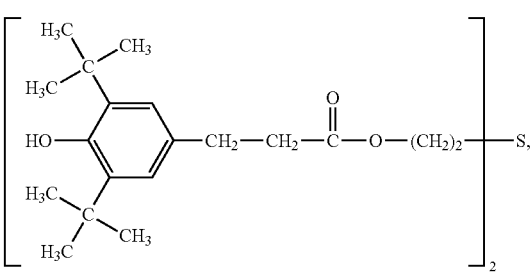

Ig
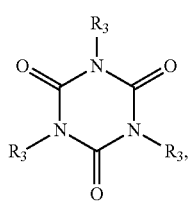

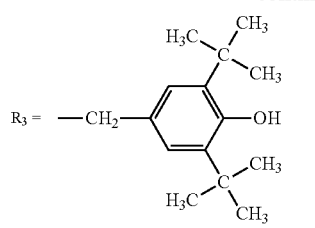

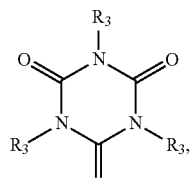

nox 3125

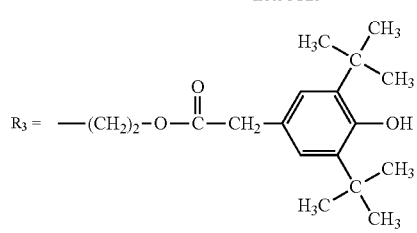

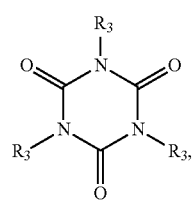

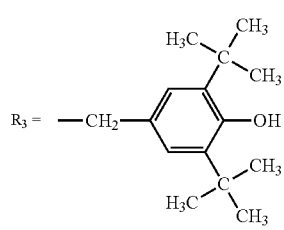

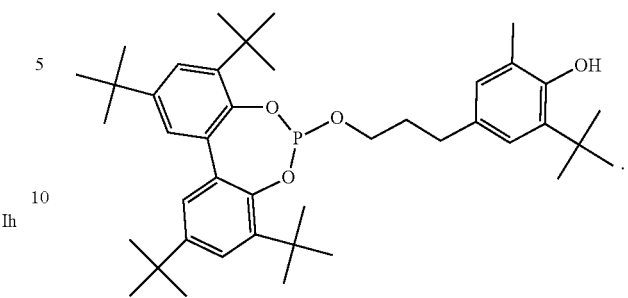

Ih

Ij

The mentioned antioxidants are commercially available, for example with the trade name Irganox (BASF SE), Songnox (Songwon), ADKstab (Adeka) or Hostanox (Clariant).

The phosphites or phosphonites which can be contained in the composition according to the invention are preferably selected from compounds of the subsequently illustrated formulae

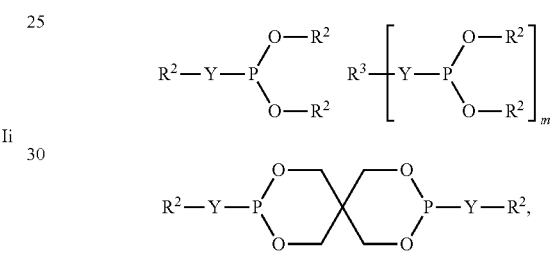

Ii respectively $R^2$ being the same or different with each occurrence and being selected from the group consisting of alkyl-, aryl- or alkylated aryl substituents, in the case where two —O—$R^2$ substituents are bonded to one phosphorus atom, two radicals $R^2$ also being able to be bonded together to form a ring system, Y being oxygen or a chemical bond, m being 1 or 2, $R^3$ in the case where m=1 being an alkyl- or aryl radical, or in the case where m=2 an alkylene- or arylene radical.

Typical examples of such compounds are the subsequently illustrated compounds:

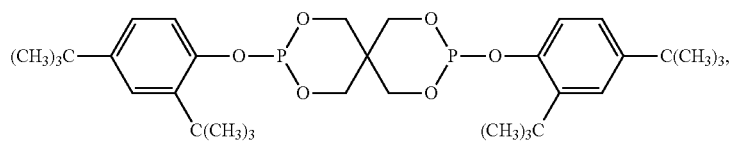

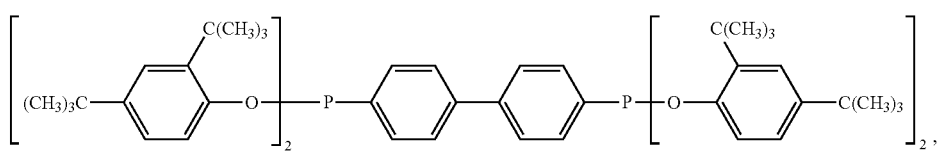

-continued

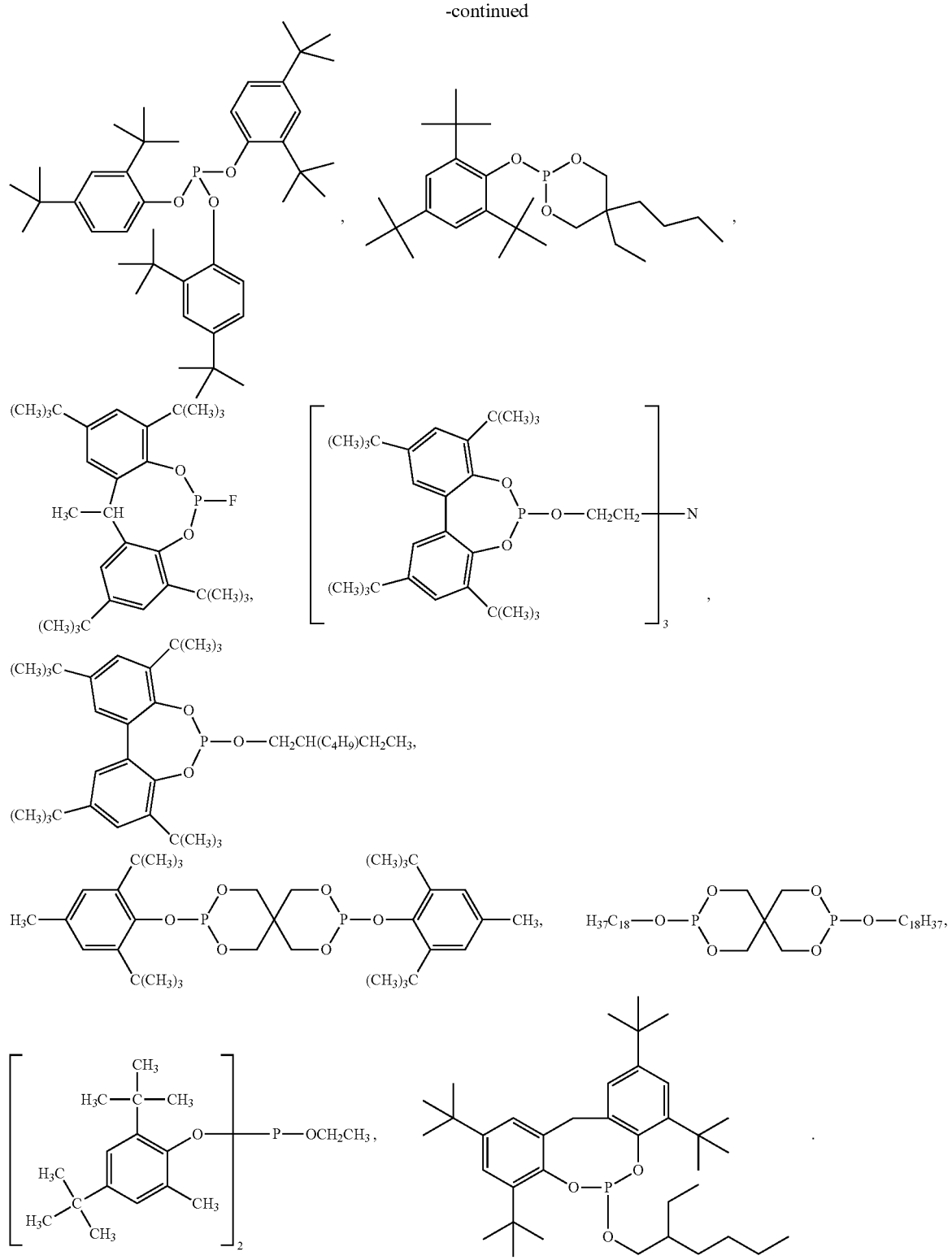

The mentioned phosphites/phosphonites are for example obtainable under the trade names Irgafos (BASF SE), Songnox (Songwon), ADKstab (Adeka), Hostanox (Clariant), Sandostab (Clariant).

Preferred amines which can be contained in the polymer composition according to the invention as antioxidants are selected from the group consisting of N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-tolnolsulphamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol), 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamine, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and also mixtures or combinations hereof.

Typical examples of such amines and particularly preferred according to the invention are the subsequently illustrated compounds:

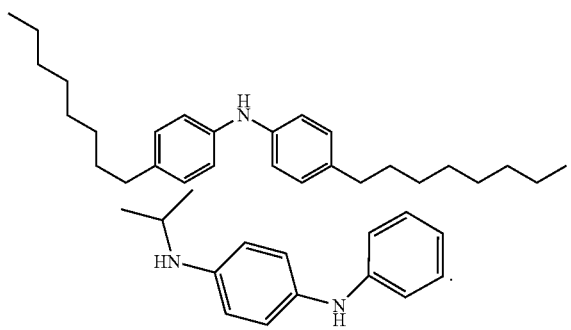

A further group of aminic antioxidants is hydroxylamines or N-oxides (nitrons), such as e.g. N,N-dialkylhydroxylamines, N,N-dibenzylhydroxylamine, N,N-dilaurylhydroxylamine, N,N-distearylhydroxylamine, N-benzyl-alpha-phenylnitron, N-octadecyl-alpha-hexadecylnitron, and also Genox EP (Chemtura) of the formula:

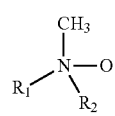

$R_1, R_2 = C_{14}-C_{24}$ alkyl chain

Genox EP

The metal deactivators which can be used in the polymer compositions according to the invention are thereby preferably selected from the group consisting of N,N'-diphenyloxamide, N-salicylal-N'-salicyloyl hydrazine, N,N'-bis(salicyloyl) hydrazine, N,N'-bis(3, 5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoylbisphenyl hydrazide, N,N'-diacetyl adipoyl dihydrazide, N,N'-bis(salicyloyl)oxylyl dihydrazide, N,N'-bis(salicyloyl)thiopropionyl dihydrazide and also mixtures or combinations.

Typical examples of such metal deactivators are the subsequently illustrated compounds:

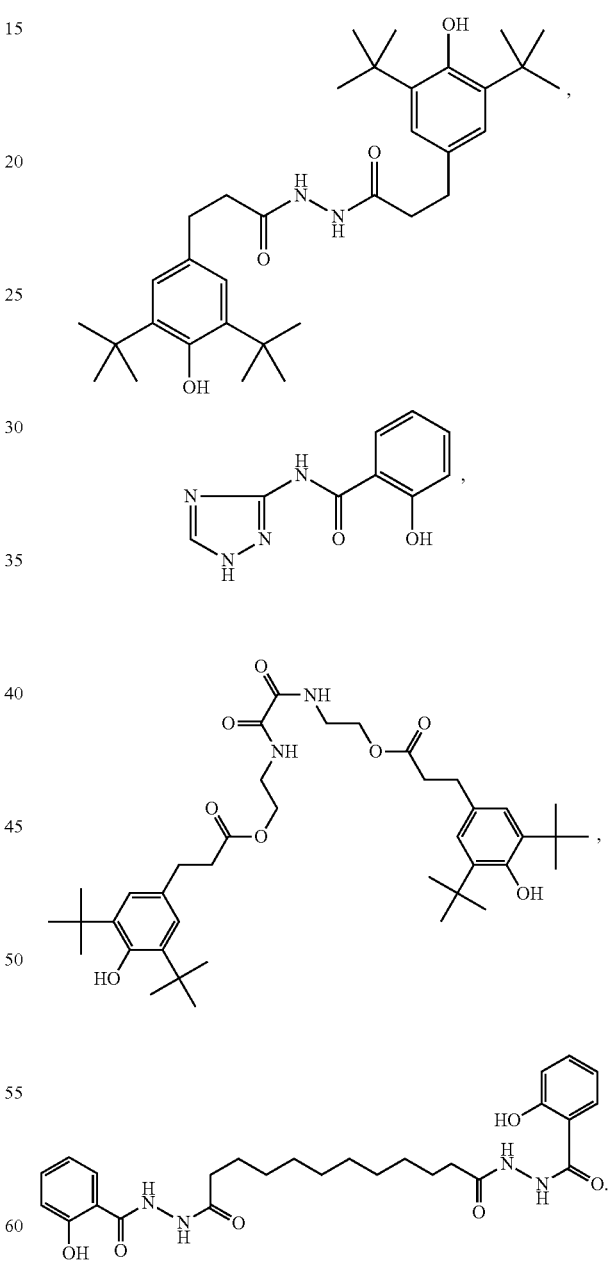

Preferred mono- or polyfunctional epoxide compounds which are used in the polymer composition according to the invention thereby comprise a subsequently illustrated grouping according to the following formula:

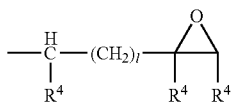

$R^4$ being the same or different with each occurrence and being selected from the group consisting of hydrogen or linear or branched alkyl radicals with 1 to 8 carbon atoms, and I being 0 or 1.

Suitable compounds are for example bisphenol-A-diglycidyl ether, bisphenol-F-diglycidyl ether, glycidyl ether of cycloaliphatic alcohols, glycidyl esters of carboxylic acids, polyglydicyl ethers of tetraphenylethane, of phenol-formaldehyde-novolacs and of cresol-formaldehyde-novolacs, polyglycidyl ethers of amines such as e.g. N,N,N',N'-tetraglycidyl diaminodiphenylmethane.

In particular, it is hereby preferred that, in the case of such epoxide systems, the previously described grouping is bonded to a polymer or copolymer, in particular that the mono- or polyfunctional epoxide compound concerns a poly(meth)acrylic acid derivative, which is functionalised with the grouping, e.g. in the form of a glycidyl ether or of a graft copolymer derived herefrom of or a copolymer hereof, preferably a copolymer with styrene or (meth)acrylic acid compounds.

Solid epoxide compounds are preferred, in particular copolymers with units of epoxy-functionalised methacrylic acid derivatives with non-functional styrene derivatives or with non-functionalised (meth)acrylic acid derivatives.

Such polymers comprising glycidyl groups are commercially available and are sold e.g. under the trade name Joncryl from the company BASF SE or MacroGran from the company Macro-M.

In addition, further additives can be used in the composition, from the group of UV absorbers, light stabilisers, benzofuranones, polyamide stabilisers, nucleation agents, filling materials and reinforcing materials, impact strength enhancers, plasticisers, lubricants, rheology modifiers, processing aids, pigments, colourants, optical brighteners, flameproofing agents, antimicrobial active substances, antistatic agents, slip agents, antiblocking agents, coupling agents, dispersants, compatibility agents, oxygen collectors, acid collectors, marking means, antifogging means. In a preferred embodiment the compositions comprise, in particular in the case of the group of preferred polymers, additives from the group of nucleation agents, such as e.g. sorbitol derivatives or trisamides, from the group of flameproofing agents, such as e.g. halogen-free, flameproofing agents based on phosphorus- and nitrogen compounds, and/or acid collectors, e.g. based on salts of long-chain acids, such as e.g. calcium stearate, magnesium stearate, zinc stearate or calcium lactate or on hydrotalcites and/or stabilisers from the group of hindered amines, preferably N-alkoxy amines of the subsequently indicated general structure.

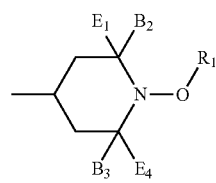

There are thereby implied

E1, E2, E3 and E4, with each appearance, independently of each other, hydrogen or a linear or branched alkyl radical with 1 to 8 carbon atoms and R1 a linear or branched alkyl radical with 1 to 8 carbon atoms.

Suitable hindered amines are for example 1,1-bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro-[4,5]decane and epichlorohydrin.

The polymer composition according to the invention comprises the described components, preferably in the subsequently indicated weight ranges or consists hereof:

a) 85 to 99.7% by weight of the at least one thermoplastic polymer or of the blend of at least two thermoplastic polymers,
b) 0.2 to 11% by weight of carbon nanotubes,
c) 0.05 to 1.0% by weight of the at least one antioxidant, and also
d) 0.05 to 3% by weight of the at least one metal deactivator and/or of the at least one mono- or polyfunctional epoxide compound, and also
e) 0 to 3% by weight of the at least one additive.

A further aspect of the invention resides in a method for stabilisation of a thermoplastic polymer against oxidative, thermal or light-induced decomposition, which aspect comprises the incorporation or the use of components a, b, c, d and possibly e as described. The composition according to the invention hence represents a master batch or concentrate which can be incorporated in a further polymer.

Introduction of components a, b, c, d according to the invention and possibly the further additives e) into the polymer of choice is effected by known methods, such as e.g. by a process which is implemented in the melt or also by dissolved or dispersed components in a solvent and evaporation of the solvent. The additives are preferably introduced into the melt in an extruder. Suitable processing machines are single-screw extruders, twin-screw extruders, planet roller extruders, ring extruders or co-kneaders.

If a plurality of components is added, these can be premixed or added individually.

Components a, b, c, d and possibly further additives e) can be added in addition to the polymer in the form of a concentrate or master batch which comprises a mixture in a concentration of 5-75%, i.e relative to 100% parts by weight of the polymer, 5 to 300 parts by weight of the previously described polymer composition are added or blended in. This is advantageous since in fact a predispersed form of the additives is present and a more homogenous product is obtained in the subsequent step.

The compositions according to the invention are preferably used for the production of moulded parts, such as e.g. by injection moulding, roto-moulding, blow-moulding, pressing processes, and also for the extrusion of e.g. profiles, foils, films, strips, coatings, cables and pipes, fibres or foams. A further field of use is varnishes, paints and coatings.

In addition, the invention relates to the use of the previously described polymer composition in the form of injection-moulded parts, foils, films, coatings, foams, fibres, cables and pipes in the electrical/electronics industry, in the field of transport and building, in the packaging industry, in the case of household appliances, consumer articles, furniture, sports apparatus, textile applications, varnishes and paints.

The present invention is described in more detail with reference to the subsequent embodiment without restricting the invention to the illustrated examples.

EMBODIMENTS

The extrusions of polypropylene (Moplen HP 500N, manufacturer: Lyondell-Basell) with a carbon nanotube master batch (CPM200GPP001, manufacturer: C-Polymers GmbH) with the additives listed in the table, were effected at a maximum temperature of 200° C. and a screw speed of rotation of 500 rpm on a twin-screw extruder ZSK 18 of the manufacturer Coperion. The obtained granulate was processed to form test pieces (tensile bar according to DIN/ISO 527-1) by means of injection moulding (Arburg Allrounder 320 A-600-170). The test pieces were then stored in a circulating air drying cabinet at 150° C. and the time until mechanical failure of the test pieces (hours until embrittlement) were determined.

TABLE 1

Compositions in polypropylene and results of ageing testing

| Example | Concentration: carbon nanotubes [%] | Composition and concentration additives | Hours until embrittlement |
|---|---|---|---|
| comparative example 1 | 0 | 0.1% AO-1 + 0.1% P-1 | 672 |
| comparative example 2 | 0 | 0.25% AO-1 + 0.25% P-1 | >1000 |
| comparative example 3 | 1 | 0.1% AO-1 + 0.1% P-1 | 326 |
| comparative example 4 | 5 | 0.1% AO-1 + 0.1% P-1 | 305 |
| comparative example 5 | 5 | 0.25% AO-1 + 0.25% P-1 | 305 |
| example 1 according to the invention | 1 | 0.1% AO-1 + 0.1% P-1 + 1% epoxide copolymer | 542 |
| example 2 according to the invention | 1 | 0.1% AO-1 + 0.1% P-1 + 0.3% MD | 624 |
| example 3 according to the invention | 5 | 0.1% AO-1 + 0.1% P-1 + 0.3% MD + 1% epoxide copolymer | 398 |
| example 4 according to the invention | 1 | 0.1% AO-1 + 0.1% P-1 + 1% bisphenol-A-diglycidyl ether resin | 446 |

AO-1 = pentaerythritol tetrakis(3-(3,5-di-tert-butyl-4-hydroxyphenyl)-propionate,
P-1 = tris(2,4-di-tert-butylphenyl)phosphite,
MD = benzenepropanoic acid, 3,5-bis(1,1-dimethylethyl)-4-hydroxy-, 2-[3-[3,5-bis(1,1-dimethylethyl)-4-hydroxyphenyl]-1-oxopropyl]hydrazide,
epoxide copolymer = Joncryl AD 4368 CS (manufacturer: BASF SE),
bisphenol-A-diglycidyl ether resin = Araldite GT 7072 (manufacturer: Huntsman)

Due to the addition of carbon nanotubes, the ageing resistance of the plastic material (comparative examples) is significantly reduced. An increase in the concentration of antioxidants (comparative examples 4 and 5) does not lead to any improvement in the ageing resistance. Surprisingly, the compositions according to the invention which include either a metal deactivator (examples 2 and 3 according to the invention) or a mono- or polyfunctional epoxide compound (examples 1, 3 and 4 according to the invention) have an increased ageing resistance.

In further examples, compositions were produced analogously to examples 1-5 and the mechanical properties were examined as a function of the storage time in the circulating air drying cabinet at 150° C. (table 2).

| | CNT [%] | Additives [%] | ZF [MPa] 0 h | ZF [MPa] 48 h | ZF [MPa] 101 h | ZF [MPa] 167 h | ZF [MPa] 240 h | ZF [MPa] 315 h |
|---|---|---|---|---|---|---|---|---|
| comparison 6 | 0 | 0.1% AO-1 + 0.1% P-1 | 37.2 | 32.8 | | 33.3 | | 35.2 |
| comparison 7 | 1 | 0.1% AO-1 + 0.1% P-1 | 35.6 | 34.7 | 34.4 | 34.5 | 19 | 0 |
| comparison 8 | 5 | 0.25% AO-1 + 0.25% P-1 | 39.0 | 38.1 | 37 | 8.7 | 0 | |
| comparison 9 | 5 | 0.1% AO-1 + 0.1% P-1 | 38.7 | 37.1 | 23.9 | 0 | | |
| example 5 according to the invention | 1 | 0.1% AO-1 + 0.1% P-1 + 1% epoxide copolymer | 35.5 | 35 | | 34.4 | 36.1 | 35.8 |
| example 6 according to the invention | 1 | 0.1% AO-1 + 0.1% P-1 + 0.3% MD | 36.5 | 34.8 | | 35.1 | 36.3 | 14.2 |

-continued

| | CNT [%] | Additives [%] | ZF [MPa] 0 h | ZF [MPa] 48 h | ZF [MPa] 101 h | ZF [MPa] 167 h | ZF [MPa] 240 h | ZF [MPa] 315 h |
|---|---|---|---|---|---|---|---|---|
| example 7 according to the invention | 5 | 0.1% AO-1 + 0.1% P-1 + 1% epoxide copolymer | 39.4 | 37.3 | 37.3 | 24.8 | 1.1 | 0 |
| example 8 according to the invention | 5 | 0.1% AO-1 + 0.1% P-1 + 1% epoxide copolymer + 0.3% MD | 39.2 | 37.6 | | 31.8 | 9.3 | 0 |

ZF = tensile strength after storage time in the circulating air oven at 150° C., determined according to ISO 527.

It is shown that CNTs drastically reduce the ageing stability of plastic materials (comparative examples 7, 8, 9, compared with comparative example 6 without CNTs), i.e. a reduction in the mechanical properties, shown with reference to the tensile strength, takes place at a clearly earlier time. By means of the additives according to the invention (examples 5-8 according to the invention), the mechanical properties can be maintained over a longer period of time.

The invention claimed is:

1. An ageing-resistant polymer composition with improved long-term stability, comprising, relative to the total composition,
   a) 82 to 99.7% by weight of at least one thermoplastic polymer or a blend of at least two thermoplastic polymers,
   b) 0.2 to 11% by weight of carbon nanotubes,
   c) 0.05 to 1.0% by weight of at least one antioxidant, selected from the group consisting of phenols, phosphites, phosphonites, amines, mixtures and combinations thereof,
   d) 0.05 to 3% by weight of at least one mono- or polyfunctional epoxide compound and at least one metal deactivator,
   wherein the mono- or polyfunctional epoxide compound comprises a group of the formula:

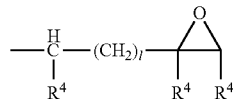

wherein $R^4$ is the same or different at each occurrence and is selected from the group consisting of hydrogen and linear or branched alkyl radicals with 1 to 8 carbon atoms, and l is 0 or 1, and
   e) 0 to 3% by weight of at least one additive.

2. The polymer composition according to claim 1, wherein the at least one thermoplastic polymer is selected from the group consisting of
   a) polymers from olefins or diolefins and polyolefin-based copolymers in the form of statistical or block structures,
   b) polystyrene, polymethylstyrene, styrene-butadiene, poly(styrene-butadiene-styrene) (SBS), poly(styrene-isoprene), poly(styrene-isoprene-styrene) (SIS), poly (styrene-butadiene-acrylonitrile) (ABS), poly(styrene-acrylonitrile-acrylate) (ASA), poly(methylacrylate-butadiene-styrene) (MBS), styrene-maleic anhydride polymers, corresponding graft copolymers, and hydrated polymers obtainable therefrom,
   c) halogen-containing polymers,
   d) polymers of unsaturated esters, polyacrylonitrile and/or polyacrylamide,
   e) polymers of unsaturated alcohols and derivatives,
   f) polyacetals,
   g) polyphenylene oxides and blends with polystyrene or polyamides,
   h) polyurethanes,
   i) polyamides and aromatic polyamides,
   j) polyimides, polyamide imides, polyether imides, polyketones, polysulphones, polyether sulphones, polyphenylene sulphide, and polybenzimidazoles,
   k) polyesters,
   l) polycarbonate,
   m) cellulose derivatives,
   n) and mixtures, combinations and blends of two or more of the previously mentioned polymers.

3. The polymer composition according to claim 2, wherein the carbon nanotubes are multiwall carbon nanotubes.

4. The polymer composition according to claim 2, wherein the phenols are selected from the group consisting of compounds of the subsequently illustrated formula

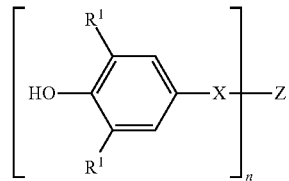

$R^1$ being the same or different with each occurrence and being selected from the group consisting of linear or branched alkyl radicals with 1 to 8 carbon atoms and hydrogen, X being selected from the group consisting of alkylene radicals, alkylene-carbonyl radicals, and alkylene-amide radicals, n being 1 to 4, and Z in the case where n=1 being hydrogen, in the case where n=2 being a chemical bond or an alkylene, in the case where n=3 being an alkinyl or in the case where n=4 being a carbon atom.

5. The polymer composition according to claim 2, wherein the phosphites and/or phosphonites are selected from compounds of the subsequently illustrated formulae

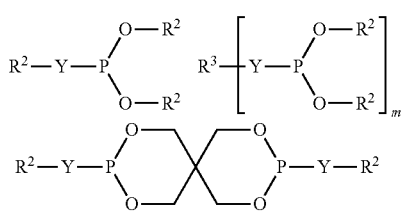

respectively

R² being the same or different with each occurrence and being selected from the group consisting of alkyl-, aryl- and alkylated aryl substituents, in the case where two —O—R² substituents are bonded to one phosphorus atom, two radicals R² also being able to be bonded together to form a ring system, Y being oxygen or a chemical bond, m being 1 or 2, R³ in the case where m=1 being an alkyl- or aryl radical, or in the case where m=2 being an alkylene- or arylene radical.

6. The polymer composition according to claim 2, wherein the amines are selected from the group consisting of N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-tolnol-sulphamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol), 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and mixtures and combinations thereof.

7. The polymer composition according to claim 2, wherein the metal deactivators are selected from the group consisting of N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl-bisphenyl hydrazide, N,N'-diacetyladipoyl dihydrazide, N,N'-bis(salicyloyl)oxylyl dihydrazide, N,N'-bis(salicyloyl) thiopropionyl dihydrazide and mixtures and combinations thereof.

8. The polymer composition according to claim 1, wherein the carbon nanotubes are multiwall carbon nanotubes.

9. The polymer composition according to claim 1, wherein the phenols are selected from the group consisting of compounds of the subsequently illustrated formula

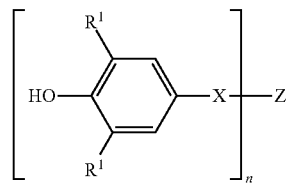

R¹ being the same or different with each occurrence and being selected from the group consisting of linear or branched alkyl radicals with 1 to 8 carbon atoms and hydrogen, X being selected from the group consisting of alkylene radicals, alkylene-carbonyl radicals, and alkylene-amide radicals, n being 1 to 4, and Z in the case where n=1 being hydrogen, in the case where n=2 being a chemical bond or an alkylene, in the case where n=3 being an alkinyl or in the case where n=4 being a carbon atom.

10. The polymer composition according to claim 1, wherein the phosphites and/or phosphonites are selected from compounds of the subsequently illustrated formulae

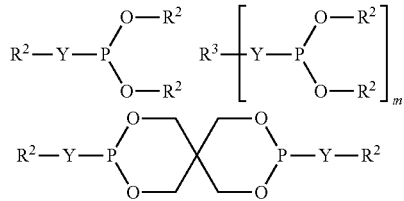

respectively

R² being the same or different with each occurrence and being selected from the group consisting of alkyl-, aryl- and alkylated aryl substituents, in the case where two —O—R² substituents are bonded to one phosphorus atom, two radicals R² also being able to be bonded together to form a ring system, Y being oxygen or a chemical bond, m being 1 or 2, R³ in the case where m=1 being an alkyl- or aryl radical, or in the case where m=2 being an alkylene- or arylene radical.

11. The polymer composition according to claim 1, wherein the amines are selected from the group consisting of N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-tolnol-sulphamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol), 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and mixtures and combinations thereof.

12. The polymer composition according to claim 1, wherein the metal deactivators are selected from the group consisting of N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl-bisphenyl hydrazide, N,N'-diacetyladipoyl dihydrazide, N,N'-bis(salicyloyl)oxylyl dihydrazide, N,N'-bis(salicyloyl) thiopropionyl dihydrazide and mixtures and combinations thereof.

13. The polymer composition according to claim 1, wherein the group of the formula:

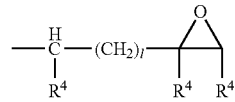

is bonded to a polymer or copolymer.

14. The polymer composition according to claim 1, wherein the additive is selected from the group consisting of nucleation agents, flameproofing agents, acid collectors, and stabilizers selected from the group of hindered amines.

15. A method for stabilisation of a polymer comprising blending into the polymer a polymer composition according to claim 1.

16. The method according to claim 15, wherein the polymer is a thermoplastic polymer selected from the group consisting of polypropylene, polyethylene and copolymers thereof, polystyrenes and copolymers, acrylonitrile-butadiene-styrene (ABS), styrene-butadiene (SB), and styrene-butadiene-styrene (SBS), polyurethanes, polyamides, polyesters, polycarbonates and mixtures and blends.

17. The method according to claim 15, wherein, relative to 100 parts by weight of the polymer, 5 to 300 parts by weight of the polymer composition are blended in.

18. A moulded part, produced from a polymer composition according to claim 1, which is in the form of injection-moulded parts, foils, films, coatings, foams, fibres, cables or pipes in the electrical/electronics industry, in the field of transport and building, in the packaging industry, in the case of household appliances, consumer articles, furniture, sports apparatus, textile applications, varnishes and paints.

* * * * *